United States Patent
Chen (10) Patent No.: US 12,555,234 B2
(45) Date of Patent: Feb. 17, 2026

(54) IMAGE PROCESSING SYSTEM AND METHOD THEREOF FOR EARLY DETECTION OF ISCHEMIC CORE OF ISCHEMIC STROKE PATIENT

(71) Applicant: Taipei Medical University, Taipei (TW)

(72) Inventor: David Carroll Chen, Taipei (TW)

(73) Assignee: Taipei Medical University, Taipei (TW)

( * ) Notice: Subject to any disclaimer, the term of this patent is extended or adjusted under 35 U.S.C. 154(b) by 314 days.

(21) Appl. No.: 18/405,850

(22) Filed: Jan. 5, 2024

(65) Prior Publication Data

US 2025/0225652 A1    Jul. 10, 2025

(51) Int. Cl.
*G06T 7/00* (2017.01)
*A61B 5/055* (2006.01)
*G16H 30/40* (2018.01)

(52) U.S. Cl.
CPC ............ *G06T 7/0012* (2013.01); *A61B 5/055* (2013.01); *G16H 30/40* (2018.01); *G06T 2207/10081* (2013.01); *G06T 2207/10088* (2013.01); *G06T 2207/20081* (2013.01); *G06T 2207/30016* (2013.01)

(58) Field of Classification Search
CPC ......... G06T 7/0012; G06T 2207/10081; G06T 2207/10088; G06T 2207/20081; G06T 2207/30016; G06T 2207/20084; A61B 5/055; G16H 30/40; G16H 50/20
See application file for complete search history.

(56) References Cited

U.S. PATENT DOCUMENTS

| | | | |
|---|---|---|---|
| 2005/0130230 A1* | 6/2005 | Davalos | G16B 20/20 435/7.1 |
| 2007/0167727 A1* | 7/2007 | Menezes | G06T 7/0012 600/410 |
| 2020/0294241 A1* | 9/2020 | Wu | G06T 7/10 |
| 2021/0093258 A1* | 4/2021 | Kalafut | A61B 6/032 |
| 2021/0098127 A1* | 4/2021 | Kalafut | G06N 3/04 |
| 2021/0353203 A1* | 11/2021 | Burman | G16H 50/30 |
| 2022/0148301 A1* | 5/2022 | Hu | G06N 3/047 |
| 2022/0395244 A1* | 12/2022 | Taubmann | A61B 6/037 |
| 2023/0342928 A1* | 10/2023 | Do | G06T 7/0012 |
| 2024/0041417 A1* | 2/2024 | Fang | A61B 6/501 |
| 2024/0050056 A1* | 2/2024 | Jeong | A61B 6/503 |

\* cited by examiner

*Primary Examiner* — Van D Huynh
(74) *Attorney, Agent, or Firm* — James W. Huffman; Huffman Law Group, PC (57) ABSTRACT

An image processing method thereof for early detection of ischemic core of ischemic stroke patient includes a model training phase and a model inference phase. In the model training phase, it first generates a pseudo diffusion-weighted MR imaging (DWI) and a generator loss according to a non-contrast-enhanced CT (NCCT) image for training; then, it generates a discriminator loss and a discriminator result according to a DWI for training and the first pseudo-DWI; then, it judges whether to end the model training phase according to the generator loss and the discriminator loss, and if so, ends the model training phase and obtains a set of parameters for inference phase, and if not, updates the parameters used in the model training phase. In the model inference phase, it generates a pseudo DWI according to an NCCT image and the set of parameters for the inference phase.

13 Claims, 6 Drawing Sheets

IMAGE PROCESSING SYSTEM AND METHOD THEREOF FOR EARLY DETECTION OF ISCHEMIC CORE OF ISCHEMIC STROKE PATIENT

BACKGROUND OF THE INVENTION

1. Field of the Present Disclosure

The present disclosure relates to a medical image processing system and a method thereof, more particularly, to an image processing system and a method for early detection of the core of cerebral infarction in ischemic stroke patients.

2. Background

In the treatment of acute ischemic stroke, early detection of the infarct core is very important. The faster the diagnosis and treatment, the better the patient's prognosis.

Non-Contrast Enhanced CT (NCCT) is the first-line examination for acute stroke and is widely used to rule out cerebral hemorrhage, although it can also be used to evaluate the infarct core of acute ischemic stroke, but there are problems such as high subjectivity, low accuracy, and large interpretation differences among doctors.

There are two imaging tools used clinically to detect the core of infarction, namely diffusion-weighted magnetic resonance imaging (Diffusion-Weighted MR Imaging, referred to as DWI) and tomography cerebral blood flow perfusion (CT Perfusion, referred to as CTP) Imaging. However, each of these imaging tools has its shortcomings. Magnetic resonance imaging diffusion-weighted imaging has high accuracy and is the gold standard for diagnosing the core of infarction. However, its equipment is expensive, its accessibility is low, and its scanning time is long. Only a few hospitals have the ability to use it on patients with acute stroke; The disadvantages of tomographic cerebral blood flow perfusion imaging include the quantitative instability of the cerebral infarct core, the need to inject contrast agents, high radiation doses, the need to use expensive commercial software (e.g., RAPID.ai) for post-processing operations, and its difficulty in diagnosis. The accuracy of cerebral infarct core is not as good as MR contrast-enhanced diffusion-weighted imaging.

Known technologies, such as Republic of China Patent No. 1542328 and Patent No. 1725813, are all based on magnetic resonance imaging diffusion-weighted imaging that is relatively expensive and takes a long time to scan. Therefore, there is an urgent clinical need at present. What is needed is an image processing technology that is lower in cost, can be widely used by various hospitals, and can accelerate the diagnosis of acute ischemic stroke.

SUMMARY OF THE INVENTION

Therefore, one embodiment of the present disclosure is directed to an image processing system for early detection of the core of cerebral infarction in ischemic stroke patients, which comprises a memory, a database, and a processor. The memory stores at least one instruction. The processor communicatively coupled to the memory and the database.

The database comprises at least one training data set, which comprises a brain tomography image without imagine for training, and a training diffusion-weighted magnetic resonance image corresponding to the brain tomography image without imagine.

The processor is used to access and execute the instruction to operate in a model training phase and a model inference phase.

The model training phase comprises a generating model operation, a discriminative model operation, a judgment step, and a parameter update step. The generating model operation is used to perform a generative model learning operation using a plurality of parameters based on the brain tomography image without imagine for training to generate a first virtual diffusion-weighted magnetic resonance imaging and a generation error. The discrimination model operation is used to perform a discrimination model learning operation using a plurality of parameters based on the diffusion-weighted magnetic resonance imaging and the first virtual diffusion-weighted magnetic resonance imaging for training to generate discrimination error and a discrimination result. The judgment step is used for judging whether to end the model training phase based on the generation error and the discrimination error, if a result of the judgment step is positive, then end the model training phase and use the generative model to calculate a currently used parameters, as an inference stage parameter set. The parameter update step is used to update the parameters used in the generating model operation and the discriminating model operation. The parameter update step is only performed if the result of the judgment step is negative.

In the model inference phase, the processor generates a virtual diffusion-weighted magnetic resonance imaging based on the brain tomography image without imagine and uses the inference stage parameter set.

Another embodiment of the present disclosure is directed to an image processing method for early detection of the core of cerebral infarction in ischemic stroke patients, which comprises a model training phase and a model inference phase.

The model training phase comprises a generating model operation, a discriminative model operation, a judgment step, and a parameter update step. The generating model operation is used to perform a generative model learning operation using a plurality of parameters based on a brain tomography image without imagine for training to generate a first virtual diffusion-weighted magnetic resonance imaging and a generation error. The discrimination model operation is used to perform a discrimination model operation for a discrimination model learning operation using a plurality of parameters based on a diffusion-weighted magnetic resonance imaging for training and a first virtual diffusion-weighted magnetic resonance imaging for training to generate a discrimination error and a discrimination result. The judgment step is used for judging whether to end the model training phase based on the generation error and the discrimination error, if a result of the judgment step is positive, then end the model training phase and use the generative model to calculate a currently used parameters, as an inference stage parameter set. The parameter update step is used to update the parameters used in the generating model operation and the discriminating model operation. The parameter update step is only performed if the result of the judgment step is negative.

In the model inference phase, a virtual diffusion-weighted magnetic resonance imaging is generated based on the brain tomography image without imagine and using the inference stage parameter set.

The effect of the present disclosure is that after the brain tomography image without imagine passes through the image processing system and method thereof for early detection of the core of cerebral infarction in ischemic stroke patients, the virtual diffusion-weighted magnetic resonance imaging can be generated, patients do not need to undergo expensive and time-consuming magnetic resonance imaging diffusion-weighted imaging, nor do they need to inject contrast agents and bear the risk of high radiation doses to perform tomographic cerebral blood flow perfusion imaging. They only need to obtain the brain tomography image without imagine first, the virtual diffusion-weighted magnetic resonance imaging can be quickly obtained.

BRIEF DESCRIPTION OF THE DRAWINGS

To describe the technical solutions in the embodiments of this application more clearly, the following briefly introduces the accompanying drawings required for describing the embodiments. Apparently, the accompanying drawings in the following description show merely some embodiments of this application, and a person of ordinary skill in the art may still derive other drawings from these accompanying drawings without creative efforts.

DESCRIPTION OF THE EMBODIMENTS

Regarding the aforementioned technical contents, features and effects of the present disclosure, they will be clearly presented in the following detailed description of two preferred embodiments with reference to the drawings.

Figure 1:
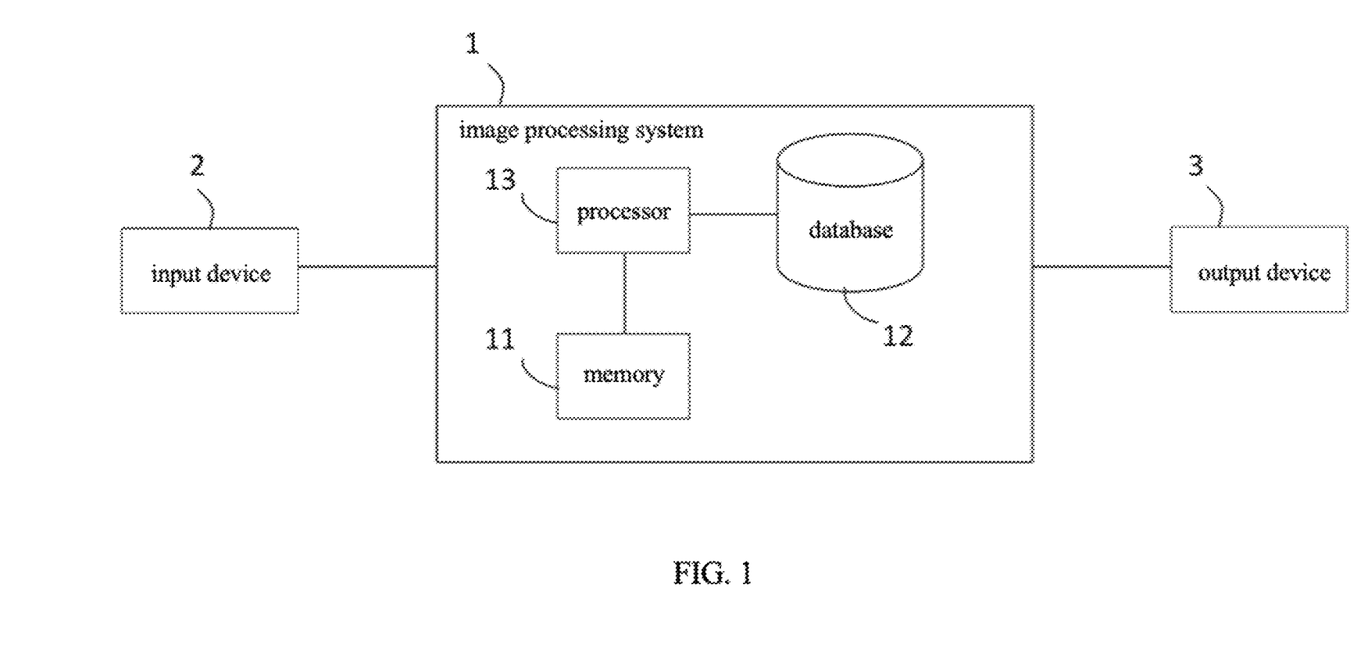
FIG. 1 is a block diagram illustrating a first preferred embodiment of an image processing system for early detection of the core of cerebral infarction in ischemic stroke patients according to this embodiment of the present disclosure.

Please refer to FIG. 1, which is a block diagram illustrating a first preferred embodiment of an image processing system for early detection of the core of cerebral infarction in ischemic stroke patients according to this embodiment of the present disclosure. The first preferred embodiment of the image processing system for early detection of the core of cerebral infarction in ischemic stroke patients 1 $f$ according to his embodiment of the present disclosure comprises a memory 11, a database 12, and a processor 13. The memory 11 stores at least one instruction. The processor 13 communicatively coupled to the memory 11 and the database 12. The image processing system 1 operates with an input device 2 and an output device 3. The input device 2 can be a non-development brain tomography device for providing a brain tomography image without imagine to the image processing system 1 for processing, the output device 3 can be a screen (but is not limited thereto), used to provide a result of the image processing system 1 to a user.

The database 12 comprises at least one training data set, the training data set comprises a brain tomography image without imagine for training, and a training diffusion-weighted magnetic resonance image corresponding to the brain tomography image without imagine. Furthermore, the brain tomography image without imagine for training and the diffusion-weighted magnetic resonance imaging for training in each of the training data sets is paired images obtained by the same patient during actual testing within two hours. In this first preferred embodiment, the patient first undergoes a conventional non-visualization brain tomography scan to obtain the brain tomography image without imagine for training for training, and then immediately uses to obtain the training diffusion-weighted magnetic resonance image the training image. The database 12 is established based on the paired images of diffusion-weighted magnetic resonance image for training, which can be regarded as a ground truth.

Among them, the processor 13 is used to access and execute the instruction in the memory 11 to perform the image processing system for early detection of the core of cerebral infarction in ischemic stroke patients 1. Further, said that t image processing system for early detection of the core of cerebral infarction in ischemic stroke patients 1 comprises a model training phase and a model inference phase.

Figure 2:
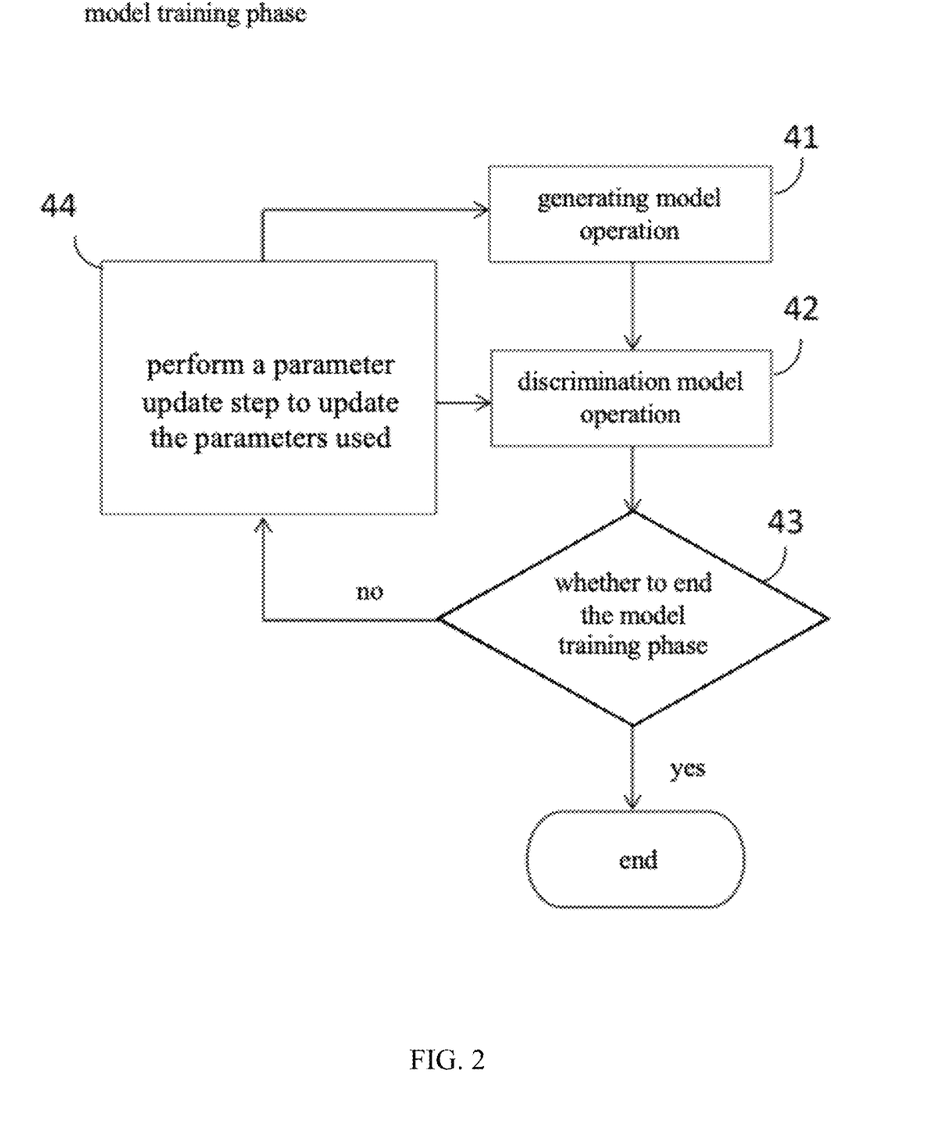
FIG. 2 is a flow chart illustrating a model training phase of an image processing method corresponding to the first preferred embodiment of the present disclosure.

Please refer to FIGS. 1 and 2. The operations and steps performed in the model training phase will be further explained below.

In a generating model operation 41, the processor 13 performs a generative model learning operation based on the brain tomography image without imagine pre-established in the database 12 to generate a first virtual diffusion-weighted magnetic resonance imaging (Pseudo-DWI), and a generation error (G-Loss). The generation error is a difference disposed between the first virtual diffusion-weighted magnetic resonance imaging and the diffusion-weighted magnetic resonance imaging for training. Among them, the generative model learning operation can adopt an existing autoencoder (AE for short) architecture, or an existing variational autoencoder (VAE for short) architecture. In this first preferred embodiment, an autoencoder architecture is adopted, which comprises an operation of at least one encoder layer, an operation of at least one bottleneck layer (or hidden layer), and an operation of at least one decoding layer. Each of the layers corresponds to a plurality of nodes, and each of the nodes corresponds to a parameter. In other words, the processor 13 uses the parameters to performs the generative model learning operation based on the undeveloped brain tomography image for training.

In a discriminative model operation 42, the processor 13 uses the first virtual diffusion-weighted magnetic resonance imaging and the diffusion-weighted magnetic resonance imaging pre-established in the database 12. A discrimination model learning operation is performed to generate a discrimination error (D-Loss) and a discrimination result. In the first preferred embodiment, the discrimination error is used to determine whether the error is disposed between the first virtual diffusion-weighted magnetic resonance imaging and the judgment of whether the diffusion-weighted magnetic resonance imaging for training is a real image. An identification result is used to indicate whether the first virtual diffusion-weighted magnetic resonance imaging and the diffusion-weighted magnetic resonance imaging for training are similar. The discriminative model operation 42 can adopt an existing identification model architecture of a patch generative adversarial network (Patch-GAN for short), which comprises at least one convolution (convolution) layer, each of the layers corresponds to a plurality of nodes, and each of the nodes corresponds to a parameter. Furthermore, the processor 13 respectively divides the first virtual diffusion-weighted magnetic resonance imaging and the diffusion-weighted magnetic resonance imaging for training into m×n blocks, and use the parameters to perform calculations based on the blocks, and the identification result is an m×n matrix, a content of which is 1 (True) or 0 (False). When the a certain area in the first virtual diffusion-weighted magnetic resonance imaging is similar to the corresponding area in the diffusion-weighted magnetic resonance imaging for training, the corresponding evaluation value in the matrix is 1.

In a judgment step 43, the processor 13 judges whether to end the model training phase based on the generation error and the discrimination error. If so, the parameters currently used by the generating model operation 41 are used as an inference stage parameter set, and ends. Otherwise, perform a parameter update step 44 to update the parameters used in the generating model operation 41 and the discrimination model operation 42, and return to the generating model operation 41 for the next round of training. In the first preferred embodiment, a judgment basis of the processor 13 is to end the model training phase when the generation error is the minimum and the discrimination error is the maximum. That is, when a difference deposed between the generation error and the discrimination error is the minimum.

It is worth mentioning that the characteristic of the present disclosure is to train the generating model operation 41 and the discrimination model operation 42 at the same time. The parameters used by the two are continuously updated during the training process, and the two are constantly confronting each other. This makes the first virtual diffusion-weighted magnetic resonance imaging generated by the generating model operation 41 approach its true standard (i.e., the diffusion-weighted magnetic resonance imaging for training), and at the same time improves the discriminating power of the discrimination model operation 42.

Figure 3:
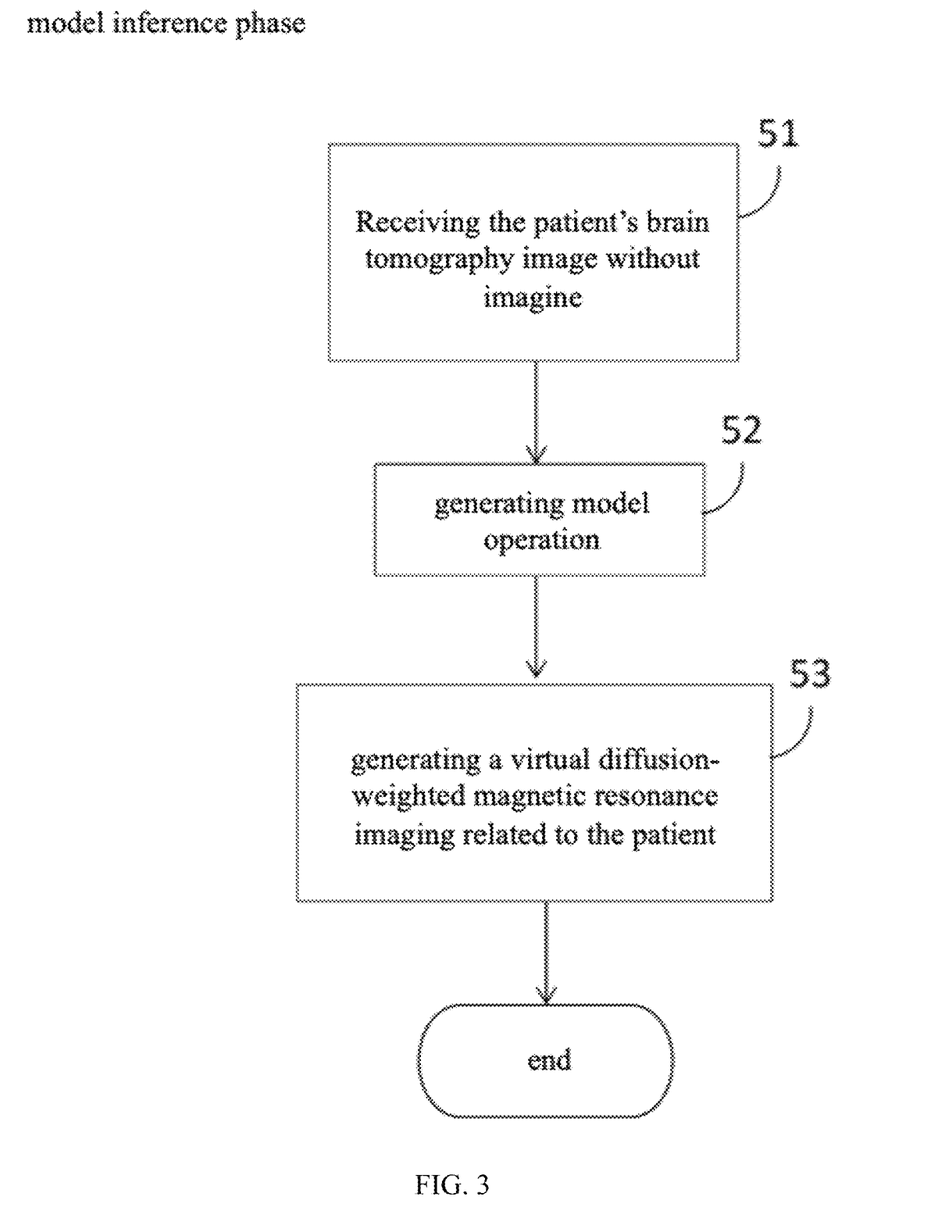
FIG. 3 is a flow chart illustrating a model inference phase of the image processing method corresponding to the first preferred embodiment of the present disclosure.

Please refer to FIGS. 1 and 3. In the model inference phase, in a receiving step 51, the image processing system 1 receives the brain tomography image without imagine of a patient from the input device 2. The processor 13 is used to perform a generating model operation 52 based on the patient's brain tomography image without imagine and use the inference stage parameter set to generate a virtual diffusion-weighted magnetic resonance imaging related to the patient. In an output step 53, the output device 3 provides the virtual diffusion-weighted magnetic resonance imaging related to the patient to the user (for example, a physician).

Figure 4:
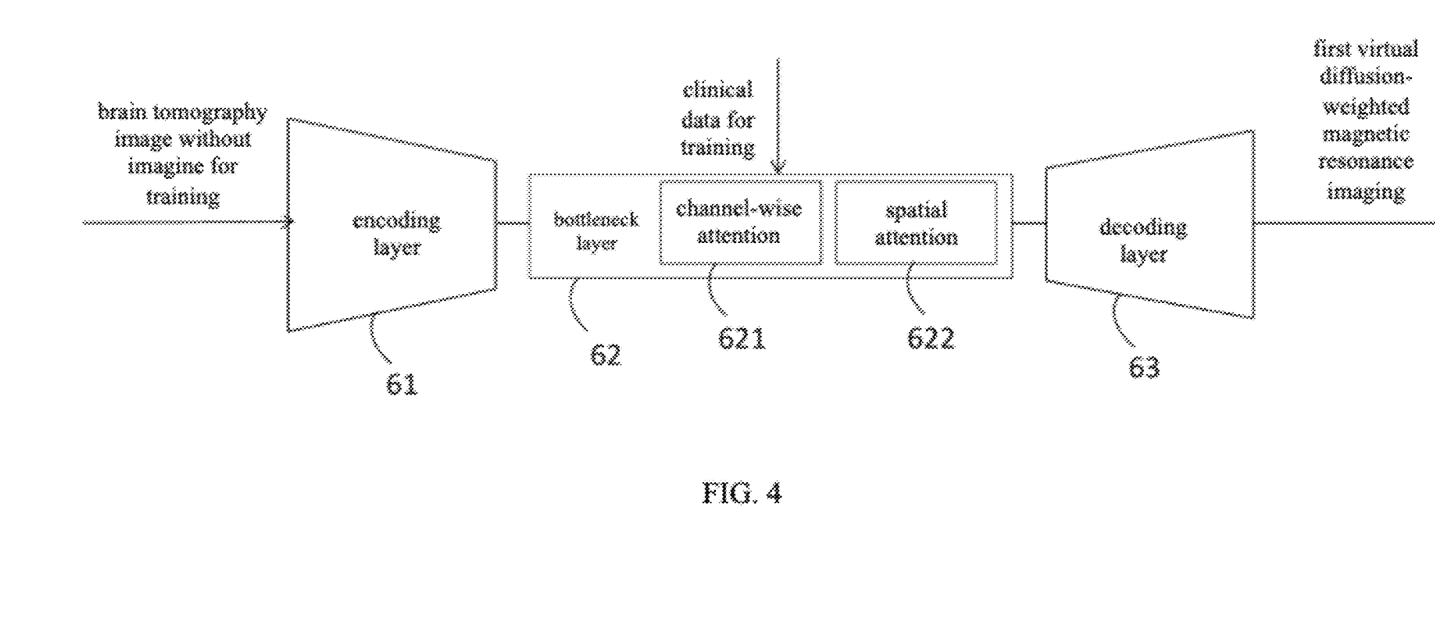
FIG. 4 is an architectural schematic diagram illustrating a generating model operation used in a second preferred embodiment of the image processing system for early detection of the core of cerebral infarction in ischemic stroke patients of the present disclosure.

Please refer to FIGS. 1, 2 and 4, a second preferred embodiment of the image processing system for early detection of the core of cerebral infarction in ischemic stroke patients 1 according to the present disclosure, which uses a hardware and its image processing method are similar to the first preferred embodiment. In the following description, the same or similar components as those in the first preferred embodiment are denoted by the same reference numerals.

The processor 13 of the image processing system 1 is used to perform a second preferred embodiment of the image processing method for early detection of the core of cerebral infarction in ischemic stroke patients according to the present disclosure. The image processing method comprises a model training phase and a model inference phase. Implementation details that are similar to the first preferred embodiment will not be described in detail below, and only differences will be described.

In this second preferred embodiment, each of the training data sets of the database comprises, in addition to the brain tomography image without imagine for training of the same patient, and the diffusion-weighted magnetic resonance imaging for training. In addition to the images, it also comprises a clinical data for training on the patient. Furthermore, the clinical data for training comprises a demographic characteristic and a temporal characteristic. The demographic characteristic comprises any one of an age, a gender, and a stroke scale (NIH Stroke Scale, referred to as NIHSS), and a brain laterality. The temporal characteristic comprises any one of a first time difference and a second time difference. The first time difference refers to an interval between the patient's stroke onset to a non-visualization brain tomography scan. The second time difference refers to an interval between the patient's non-visualization brain tomography scan and a partial tomography and diffusion-weighted MRI. The aforementioned clinical data for training, such as the stroke scale, laterality, etc., are all commonly used terms in the medical field of this case, so they will not be described in detail here.

In the second preferred embodiment, in the model training phase, the generating model operation 41 adopts an autoencoder architecture, which comprises an operation of at least one encoding layer 61, an operation of at least one bottleneck layer 62, and an operation of at least one decoding layer 63, and the operation of the encoding layer 61 and the decoding layer 63 is similar to the first preferred embodiment, and the main difference is the operation of the bottleneck layer 62. In addition to receiving an output of the encoding layer 61 and performing the operation of the bottleneck layer as in the first preferred embodiment, the bottleneck layer 62 is also used to receive the clinical data for training and perform operations using the clinical data for training. An operation of channel-wise attention 621 and an spatial attention 622 are provided.

In the second preferred embodiment, the clinical data comprises numerical values. During the operation, each of the numerical values will first be converted into a p×p matrix, and the matrix is filled with the numerical value, and then, the operation of channel-wise attention 621 and the operation of spatial attention 622 are performed with the matrix filled with the values. For example, the age of a patient will be converted into a p×p matrix, and each of the nodes in the matrix is filled with the age of the patient; also, if the gender is represented by 1 for male and 2 for female, then if the patient is male, each of the nodes in the p×p matrix is filled with 1, and so on. Then, the six matrices filled with values are used to perform the operation on the channel focus 621 and the space focus 622. The operations of the channel-wise attention 621 and the operation of spatial attention 622 can be clearly understood by those with ordinary knowledge in the technical field of this case, so they are not described in detail here.

It is worth mentioning that although in the second preferred embodiment, the generating model operation 41 adopts an autoencoder architecture, the generating model operation 41 can also adopt a variational autoencoder architecture, and there is not limited to this. When using a variational autoencoder architecture, the clinical data for training in certain training data set of the database 12 can be replaced with random numbers to perform the operations of the channel-wise attention 621 and the operation of spatial attention 622.

Figure 5:
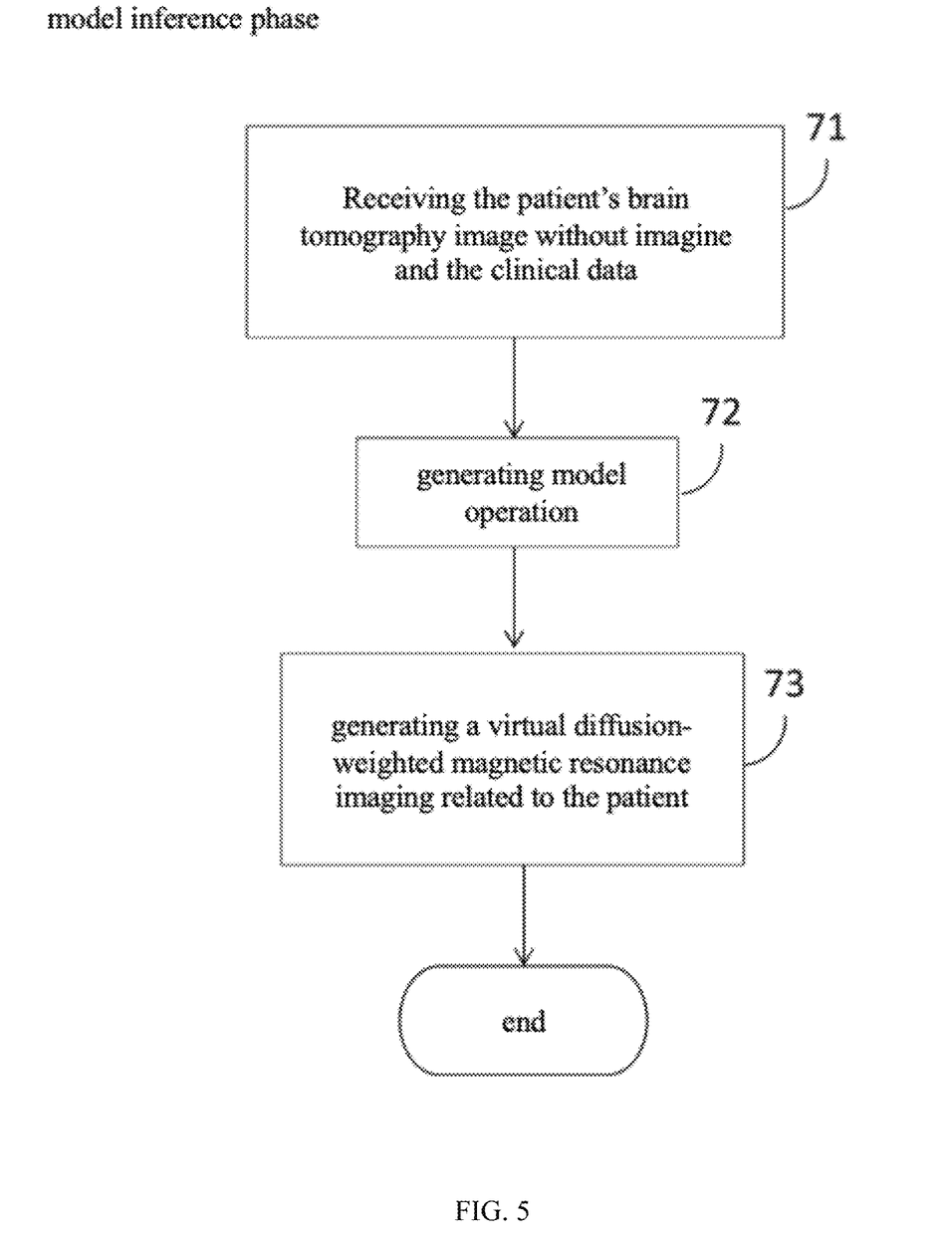
FIG. 5 is a flow chart illustrating a model inference phase of an image processing method corresponding to the second preferred embodiment of the present disclosure.

Please refer to FIGS. 1 and 5. In a model inference phase of the second preferred embodiment, in a receiving step 71, the image processing system 1 receives a patient's brain tomography image without imagine from the input device 2. The processor 13 uses the inference stage parameter set obtained in the model training phase to perform a generating model operation 72 based on the patient's brain tomography image without imagine and the clinical data to generate a virtual diffusion-weighted magnetic resonance imaging related to the patient. In an output step 73, the output device 3 provides the virtual diffusion-weighted magnetic resonance imaging related to the patient to the user (e.g., a physician). It should be noted that since the present disclosure aims to use the generating model operation 72 to generate the virtual diffusion-weighted magnetic resonance imaging after the patient has completed the preliminary non-visualization brain tomography scan, that is to say, it will not be used for this purpose. The patient underwent diffusion-weighted magnetic resonance imaging. Therefore, in the inference phase of the model, the second time difference of the temporal characteristic of the clinical data (i.e., the interval between the patient's non-visualization brain tomography scan and the magnetic resonance imaging diffusion-weighted imaging) can be an arbitrary given value.

Figure 6:
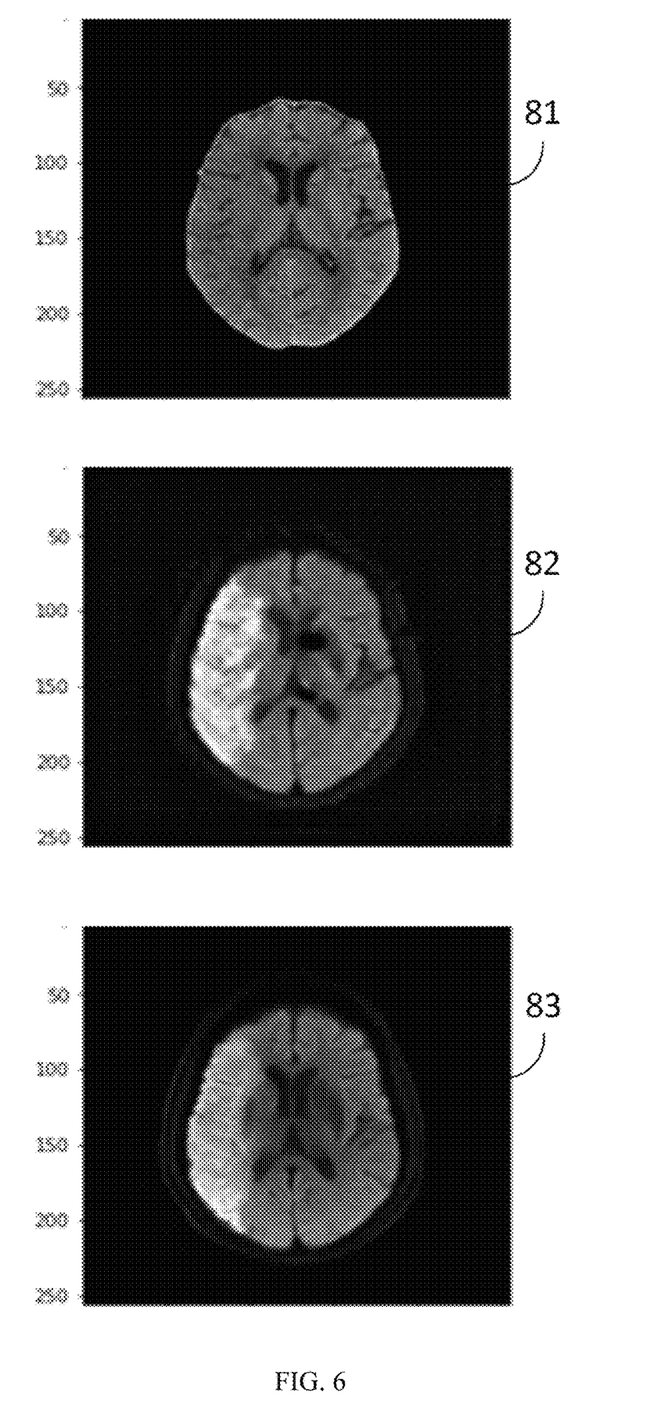
FIG. 6 is a schematic diagram illustrating a virtual diffusion-weighted magnetic resonance imaging obtained after a brain tomography image without imagine of a patient is processed, and an actual diffusion-weighted magnetic resonance imaging of the patient according to one embodiment of the present disclosure.

Please refer to FIGS. 1 and 6. After a patient's undeveloped brain tomography image 81 passes through the image processing system 1 of the present disclosure, a virtual diffusion-weighted magnetic resonance image 82 as shown in FIG. 6 can be obtained. It is very similar to an actual diffusion-weighted magnetic resonance image 83 of the patient. Among them, a bright area in the virtual diffusion-weighted magnetic resonance image 82 and the diffusion-weighted magnetic resonance image 83 is the area where a lesion is located. That is, the virtual diffusion-weighted magnetic resonance image 82 can be used for early detection of the core of cerebral infarction in ischemic stroke patients.

To sum up the above, with the image processing system 1 of the present disclosure, the patient does not need to undergo expensive and time-consuming diffusion-weighted magnetic resonance imaging, nor does he need to inject contrast agents and bear the risk of high radiation doses to perform tomographic cerebral blood flow perfusion imaging, only after the first-line examination (obtaining the non-development brain tomography image 81), the virtual diffusion-weighted magnetic resonance image 82 can be quickly obtained, which is used for early detection of the core of cerebral infarction in ischemic stroke patients. A accuracy of the infarct core is similar to an effect of the diffusion-weighted magnetic resonance image 83, so the purpose of the present disclosure can indeed be achieved.

However, the above are only examples of the present disclosure. They should not be used to limit the scope of the present disclosure. Any simple equivalent changes and modifications made in accordance with the patent scope of the present disclosure and the content of the patent specification, are still within the scope of the patent of this invention.

What is claimed is:

1. An image processing system for early detection of the core of cerebral infarction in ischemic stroke patients, comprising:
    a memory, storing at least one instruction;
    a database, comprising at least one training data set, wherein the training data set comprises a brain tomography image without imagine for training, and a training diffusion-weighted magnetic resonance image corresponding to the brain tomography image without imagine; and
    a processor, communicatively coupled to the memory and the database, wherein the processor is used to access and execute the instruction to operate in a model training phase, which comprises:
        a generating model operation, used to perform a generative model learning operation using a plurality of parameters based on the brain tomography image without imagine for training to generate a first virtual diffusion-weighted magnetic resonance imaging and a generation error;
        a discrimination model operation, used to perform a discrimination model learning operation using a plurality of parameters based on the diffusion-weighted magnetic resonance imaging and the first virtual diffusion-weighted magnetic resonance imaging for training to generate a discrimination error and a discrimination result;
        a judgment step, used for judging whether to end the model training phase based on the generation error and the discrimination error, if a result of the judgment step is positive, then end the model training phase and use the generative model to calculate a currently used parameters, as an inference stage parameter set; and
        a parameter update step, used to update the parameters used in the generating model operation and the discriminating model operation, wherein the parameter update step is only performed if the result of the judgment step is negative.

2. The image processing system for early detection of the core of cerebral infarction in ischemic stroke patients as claimed in claim 1, wherein the processor is also used to access and execute the instruction to operate in a model inference phase, in which the processor generates a virtual diffusion-weighted magnetic resonance imaging based on the brain tomography image without imagine and using the inference stage parameter set.

3. The image processing system for early detection of the core of cerebral infarction in ischemic stroke patients as claimed in claim 1, wherein the training data set of the database further comprises a clinical data for training, the processor performs the generative model learning operation based on the brain tomography image without imagine for training and the clinical data for training in the model training phase.

4. The image processing system for early detection of the core of cerebral infarction in ischemic stroke patients as claimed in claim 3, wherein the processor is also used to access and execute the instruction to operate in a model inference phase, in which the processor generates a virtual diffusion-weighted magnetic resonance imaging based on the brain tomography image without imagine and the clinical data and using the inference stage parameter set.

5. An image processing method for early detection of the core of cerebral infarction in ischemic stroke patients, comprising a model training phase, which comprising the following operations and steps:
    performing a generating model operation for a generative model learning operation using a plurality of parameters based on a brain tomography image without imagine for training to generate a first virtual diffusion-weighted magnetic resonance imaging and a generation error;

performing a discrimination model operation for a discrimination model learning operation using a plurality of parameters based on a diffusion-weighted magnetic resonance imaging for training and a first virtual diffusion-weighted magnetic resonance imaging for training to generate a discrimination error and a discrimination result;

performing a judgment step for judging whether to end the model training phase based on the generation error and the discrimination error, if a result of the judgment step is positive, then end the model training phase and use the generative model to calculate a currently used parameters, as an inference stage parameter set; and performing a parameter update step to update the parameters used in the generating model operation and the discriminating model operation, wherein the parameter update step is only performed if the result of the judgment step is negative.

6. The image processing method for early detection of the core of cerebral infarction in ischemic stroke patients as claimed in claim 5, further comprising a model training phase, in which the model based on the brain tomography image without imagine and using an inference stage parameter set to generate a virtual diffusion-weighted magnetic resonance imaging.

7. The image processing method for early detection of the core of cerebral infarction in ischemic stroke patients as claimed in claim 5, wherein a training data set further comprises a clinical data for training, the generative model learning operation is performed based on the brain tomography image without imagine for training and the clinical data for training in the model training phase.

8. The image processing method for early detection of the core of cerebral infarction in ischemic stroke patients as claimed in claim 7, further comprises a model inference phase, in which the model based on the brain tomography image without imagine for training and the clinical data for training and using the inference stage parameter set to generate a virtual diffusion-weighted magnetic resonance imaging.

9. The image processing method for early detection of the core of cerebral infarction in ischemic stroke patients as claimed in claim 7, wherein the clinical data for training comprises at least one numerical value, which is converted into a matrix, which is filled with the numerical value, and then the generating model operation is performed based on the brain tomography image without imagine for training and the matrix in the model training phase.

10. The image processing method for early detection of the core of cerebral infarction in ischemic stroke patients as claimed in claim 9, wherein the generating model operation in the model training phase comprises an operation of at least one encoder layer, an operation of at least one bottleneck layer, and an operation of at least one decoding layer, and the operation of the bottleneck layer performs a channel attention operation based on the matrix.

11. The image processing method for early detection of the core of cerebral infarction in ischemic stroke patients as claimed in claim 9, wherein the generating model operation in the model training phase comprises an operation of at least one encoding layer, an operation of at least one bottleneck layer, and an operation of at least one decoding layer operation, and the operation of the bottleneck layer performs a spatial attention operation based on the matrix.

12. The image processing method for early detection of the core of cerebral infarction in ischemic stroke patients as claimed in claim 7, wherein the clinical data for training comprises a demographic characteristic, which comprises any one of an age, a gender, a stroke scale, and a brain laterality.

13. The image processing method for early detection of the core of cerebral infarction in ischemic stroke patients as claimed in claim 7, wherein the clinical data for training comprises a temporal characteristic, which comprises any one of a first time difference and a second time difference, the first time difference refers to an interval between the patient's stroke onset to a non-visualization brain tomography scan, and the second time difference refers to an interval between the patient's non-visualization brain tomography scan and a partial tomography and diffusion-weighted MRI.

* * * * *